United States Patent
Komori

(10) Patent No.: US 6,437,501 B1
(45) Date of Patent: *Aug. 20, 2002

(54) CRT BULB GLASS CONTAINING PBO AND $FE_2O_3$

(75) Inventor: Hiroshi Komori, Otsu (JP)

(73) Assignee: Nippon Electric Glass Co., Ltd., Otsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/529,747

(22) PCT Filed: Sep. 3, 1999

(86) PCT No.: PCT/JP99/04793

§ 371 (c)(1),
(2), (4) Date: Apr. 18, 2000

(87) PCT Pub. No.: WO00/14022

PCT Pub. Date: Mar. 16, 2000

(30) Foreign Application Priority Data

Sep. 4, 1998 (JP) ............................................ 10-251254
Sep. 4, 1998 (JP) ............................................ 10-251329

(51) Int. Cl.$^7$ ........................ C03C 3/102; C03C 3/105; H01J 29/86
(52) U.S. Cl. ............................ 313/480; 501/60; 501/62
(58) Field of Search ................................. 313/480, 482; 501/59, 60, 62; 445/43

(56) References Cited

U.S. PATENT DOCUMENTS

| | | |
|---|---|---|
| 3,445,256 A | 5/1969 | Dalton |
| 3,669,697 A | 6/1972 | Drake et al. |
| 3,672,919 A | 6/1972 | Sack |
| 4,061,943 A * | 12/1977 | DiDominico et al. ....... 313/482 |
| 4,781,639 A * | 11/1988 | Misono ....................... 445/43 |

FOREIGN PATENT DOCUMENTS

| | | | |
|---|---|---|---|
| EP | 0 023 312 | 2/1981 | ............. C03C/3/10 |
| FR | 2 531 064 | 2/1984 | ............. C03C/3/10 |
| JP | 02204344 | 8/1990 | ............. C03C/8/24 |
| JP | 04074733 | 3/1992 | ............. C03C/8/24 |
| JP | 07061836 | 3/1995 | ............. C03C/8/02 |

OTHER PUBLICATIONS

English et al. (1927) "The Properties of Some Soda–Lead Oxide–Silica Glasses", *Journal of the Society of Glass Technology*, vol. 11, pp. 300–303, (XP–002123227) (no month).

* cited by examiner

*Primary Examiner*—Michael H. Day
(74) *Attorney, Agent, or Firm*—Collard & Roe, P.C.

(57) ABSTRACT

In an X-ray absorbing CRT bulb glass containing 10–40 weight % PbO and having an absorption coefficient not smaller than 40 cm$^{-1}$ with respect to an X-ray having a wavelength of 0.6 angstrom, the glass contains 0.06–10 weight % $Fe_2O_3$ to thereby suppress lead from leaching into water in the atmosphere or in the ground where the CRT is wasted and dumped, so as to avoid the environmental pollution by the lead leached in the ground.

4 Claims, No Drawings

CRT BULB GLASS CONTAINING PBO AND FE₂O₃

CROSS-REFERENCE TO RELATED APPLICATION

Applicant claims priority under 35 U.S.C. §119 of Japanese applications Nos. 251254/1998 and 251329/1998, both filed Sep. 4, 1998. Applicant also claims priority under 35 U.S.C. §120 of PCT/JP99/04793, filed on Sep. 3, 1999. The international application under PCT article 21 (2) was not published in English.

INDUSTRIAL APPLICATION FIELD

The present invention relates to a CRT (cathode-ray tube) bulb glass containing PbO for X-ray absorption and, in particular, to such an X-ray absorbing glass which is useful for a funnel part or a neck part of a color CRT bulb.

PRIOR ART

A CRT bulb comprises a panel part having an inner surface for forming a fluorescent screen thereon, a neck part for supporting an electron gun therein, a funnel part connecting the panel part and the neck part, and a stem sealing an end portion of the neck part. These parts are made of glass having properties individually adaptable thereto.

In operation of the CRT, the electron gun emits an electron beam which, in turn, produces, upon impinging onto the fluorescent screen, a visible light together with X-ray radiation. The X-ray radiation is harmful for human body and must be reduced to an acceptable level.

To this end, a conventional CRT bulb is usually made of glass having a high X-ray absorptivity, which contains lead oxide (PbO). For example, the neck part for supporting the electron gun is made of glass containing 20–40 weight % Pbo of a high X-ray absorptivity. The glass has an absorption coefficient not smaller than 80 cm$^{-1}$ with respect to the X-ray having a wavelength of 0.6 angstrom.

The funnel part is made of glass containing 10–30 weight % PbO to thereby have an absorption coefficient not smaller than 40 cm$^{-1}$ with respect to the X-ray having a wavelength of 0.6 angstrom.

PROBLEM TO BE SOLVED BY THE INVENTION

Conventionally, as one approach to disposal of the CRT, it is practiced to dump the CRT under the ground after it is crushed into pieces. However, PbO contained in the glass may possibly dissolve out or be leached in water such as rain, moisture in the atmosphere and/or in the ground during a long period of time. It is a great concern that the lead leached would unfavorably result in environmental pollution.

In order to avoid the environmental pollution caused by lead leached from the CRT bulb glass into the ground, it is a measure to decrease the content of PbO in the CRT bulb glass. However, if PbO is decreased by more than a predetermined amount, it is impossible to obtain a sufficient X-ray absorptivity.

To compensate for this, it may be considered to make the glass contain a large quantity of SrO or BaO which exhibits a relatively high X-ray absorptivity. In this approach, however, a liquid-phase temperature of the glass increases so that the glass tends to be devitrified, resulting in a difficulty in shaping the glass.

Therefore, it is an object of the present invention to provide an X-ray absorbing CRT bulb glass which, without decreasing PbO content in comparison with conventional CRT bulb glass, can suppress its PbO content to dissolve out even if it is dumped under the ground.

MEANS TO SOLVE THE PROBLEM

As a result of various experiments, the present inventor has found out that addition of a predetermined amount of $Fe_2O_3$ into lead glass can suppress the lead content to leach into water. This could be understood to be based on the reason that, upon addition of Fe2O3, a network structure of the glass is electrically strengthen by Fe ions to make gaps in the network structure narrow so that it Pb ions hardly go out through the gaps.

The present invention is based on the novel knowledge.

According to the present invention, there is provided an X-ray absorbing CRT bulb glass containing 10–40 weight % PbO and having an absorption coefficient not smaller than 40 cm$^{-1}$ with respect to an X-ray having a wavelength of 0.6 angstrom, wherein the glass contains 0.06–10 weight % $Fe_2O_3$.

According to an aspect of the present invention, there is provided a CRT bulb glass containing 20–40 weight % PbO and having an absorption coefficient not smaller than 80 cm$^{-1}$ with respect to X-ray having a wavelength of 0.6 angstrom, wherein the glass contains 0.06–10 weight % $Fe_2O_3$, and is used for a neck glass.

According to another aspect of the present invention, there is provided a CRT bulb glass containing 10–30 weight % PbO and having an absorption coefficient not smaller than 40 cm$^{31\ 1}$ with respect to X-ray having a wavelength of 0.6 angstrom, wherein the glass contains 0.06–10 weight % $Fe_2O_3$, and is used for a funnel glass.

DESCRIPTION OF THE INVENTION

The X-ray absorbing CRT bulb glass containing PbO of the present invention contains 0.06–10 weight % $Fe_2O_3$, preferably 0.1–10 weight %, and more preferably 0.5–5weight %, and is thereby possible to maintain a high X-ray absorptivity and to considerably suppress lead content to dissolve out. It is noted that $Fe_2O_3$ causes no environmental pollution even if it is introduced into the ground.

The reason why the content of $Fe_2O_3$ is limited as mentioned above is as follows. When the content is less than 0.06 weight %, it is impossible to obtain a remarkable effect of suppressing lead from leaching. On the other hand, the content of more than 10 weight % makes it difficult to shape the glass due to devitrification of the glass. Further, if the content of $Fe_2O_3$ is increased, an infrared transmittance of a molten glass is decreased, so that it becomes difficult to uniformly or homogeneously melt the glass in a glass melting tank. Especially, in case where the glass is melted in a large-sized tank, melt of the glass is degraded so that stones or other defects tend to be produced in the molten glass. Thus, it is desirable to suppress the $Fe_2O_3$ content to a level as small as possible.

When the CRT bulb glass of the present invention is used as a neck glass, it is preferable to contain 20–40 weight % PbO and to have a high absorption coefficient not smaller than 80 cm$^{-1}$ with respect to X-ray having a wavelength of 0.6 angstrom. When the content of PbO is less than 20 weight %, it is difficult to obtain a sufficient X-ray absorptivity as the neck glass. On the other hand, the content of more than 40 weight % is unfavorable because the viscosity of the glass becomes excessively low, resulting in difficulty in forming a neck. In addition, when the absorption coefficient is less than 80 cm$^{-1}$ with respect to X-ray having a wavelength of 0.6 angstrom, the CRT bulb glass is not suitable for the neck glass because X-ray quantity transmitted therethrough becomes excessive, resulting in an adverse influence on the human body.

A composition suitable as the CRT neck glass essentially consists of, by weight percent, 38–58% $SiO_2$, 0–5% $Al_2O_3$, 20–40% PbO, 0–5% MgO, 0–6% CaO, 0–9% SrO, 0–9% BaO, 0–5% $Na_2O$, 6–15% $K_2O$, 0–1% $Sb_2O_3$, 0–10% $TiO_2$, and 0.06–10% $Fe_2O_3$, and preferably 40–55% $SiO_2$, 0.5–4% $Al_2O_3$, 25–38% PbO, 0–3% MgO, 0–4% CaO, 0–7% SrO, 0–7% BaO, 0–4% $Na_2O$, 8–14% $K_2O$, 0–0.6% $Sb_2O_3$, 0.1–5% $TiO_2$, and 0.5–5% $Fe_2O_3$.

When the CRT bulb glass of the present invention is used as a funnel glass, it is preferable to contain 10–30 weight % PbO and to exhibit a high absorption coefficient not smaller than 40 cm$^{-1}$ with respect to X-ray having a wavelength of 0.6 angstrom. When the content of PbO is less than 10 weight %, it is difficult to obtain a sufficient X-ray absorptivity as the funnel glass. On the other hand, the content of more than 30 weight % is unfavorable because the viscosity of the glass becomes excessively low, resulting in difficulty in forming a funnel.

In addition, when the absorption coefficient is less than 40 cm$^{-1}$ with respect to X-ray having a wavelength of 0.6 angstrom, the CRT bulb glass is not suitable for the funnel glass because the X-ray quantity transmitted therethrough becomes excessive, resulting in an adverse influence on the human body.

A composition suitable as the CRT funnel glass essentially consists of, by weight percent, 48–58% $SiO_2$, 0.5–6% $Al_2O_3$, 10–30% PbO, 0–5% MgO, 1–6% CaO, 0–9% SrO, 0–9% BaO, 3–9% $Na_2O$, 4–11% $K_2O$, 0–1% $Sb_2O_3$, 0–10% $TiO_2$, and 0.06–10% $Fe_2O_3$, and preferably 49–57% $SiO_2$, 1–5% $Al_2O_3$, 15–27% PbO, 0–4% MgO, 2–5% CaO, 0–4% SrO, 0–4% BaO, 4–8% $Na_2O$, 5–10% $K_2O$, 0–0.6% $Sb_2O_3$, 0.1–5% $TiO_2$, and 0.5–5% $Fe_2O_3$.

In the present invention, it is possible to contain other components in addition to those mentioned above as far as characteristics of the glass are not deteriorated. For example, $ZrO_2$, $CeO_2$, $Li_2O$, and $V_2O_5$ may be added up to 3 weight % in total. It should be avoided to add those components such as $Cr_2O_3$, CdO, and $As_2O_3$ which may possibly cause environmental pollution when dumped in the ground.

EXAMPLES

Now, description will be made in detail about a CRT bulb glass according to the present invention with reference to examples and comparative examples.

Table 1 shows examples of the present invention (samples Nos. 1–5) and a comparative example (sample No. 6). Each of these samples is a material suitable for a neck glass.

Table 2 shows examples of the present invention (samples Nos. 7–11) and a comparative example (sample No. 12). Each of these samples is a material suitable for a funnel glass.

TABLE 1

| | (weight %) | | | | | |
|---|---|---|---|---|---|---|
| | 1 | 2 | 3 | 4 | 5 | 6 |
| $SiO_2$ | 45.7 | 42.6 | 49.1 | 45.5 | 52.5 | 47.35 |
| $Al_2O_3$ | 2.8 | 2.0 | 0.5 | 3.4 | 1.4 | 2.9 |
| PbO | 33.0 | 35.0 | 28.0 | 31.0 | 28.0 | 33.5 |
| MgO | — | 0.5 | — | 1.0 | — | — |
| CaO | 1.6 | 2.5 | — | 1.3 | 0.1 | 1.3 |
| SrO | 1.9 | — | 5.5 | 2.0 | 2.4 | 2.1 |
| BaO | — | — | 0.5 | 2.0 | 1.8 | — |
| $Na_2O$ | 2.6 | 1.2 | 0.5 | 3.0 | 0.8 | 2.6 |
| $K_2O$ | 10.0 | 11.0 | 12.5 | 9.0 | 12.0 | 9.8 |
| $Sb_2O_3$ | 0.4 | 0.2 | 0.4 | 0.3 | 0.5 | 0.4 |
| $Fe_2O_3$ | 2.0 | 5.0 | 3.0 | 1.5 | 0.5 | 0.05 |
| Coefficient of X-ray absorption (cm$^{-1}$) | 101.1 | 105.0 | 95.1 | 97.0 | 89.8 | 101.8 |
| Lead leached (mg/l) | 0.7 | 0.3 | 0.5 | 0.9 | 1.1 | 1.4 |
| Coefficient of thermal expansion (×10$^{-7}$/° C.) | 98 | 92 | 96 | 95 | 93 | 97 |

TABLE 2

| | (weight %) | | | | | |
|---|---|---|---|---|---|---|
| | 7 | 8 | 9 | 10 | 11 | 12 |
| $SiO_2$ | 50.7 | 49.3 | 49.5 | 53.1 | 57.0 | 52.65 |
| $Al_2O_3$ | 3.3 | 2.0 | 4.9 | 1.0 | 1.5 | 3.3 |
| PbO | 22.8 | 23.3 | 19.0 | 25.0 | 17.5 | 22.8 |
| MgO | 1.9 | 2.5 | 2.0 | 0.5 | — | 1.9 |
| CaO | 3.8 | 3.5 | 3.9 | 4.2 | 2.5 | 3.8 |
| SrO | 0.6 | — | 2.0 | 1.0 | 3.5 | 0.6 |
| BaO | 0.7 | 0.1 | 1.5 | — | 3.0 | 0.7 |
| $Na_2O$ | 6.3 | 6.2 | 6.2 | 5.0 | 4.5 | 6.3 |
| $K_2O$ | 7.6 | 7.9 | 7.8 | 8.5 | 9.0 | 7.6 |
| $Sb_2O_3$ | 0.3 | 0.2 | 0.2 | 0.2 | 0.4 | 0.3 |
| $Fe_2O_3$ | 2.0 | 5.0 | 3.0 | 1.5 | 1.1 | 0.05 |
| Coefficient of X-ray absorption (cm$^{-1}$) | 67.1 | 68.3 | 61.0 | 72.7 | 60.0 | 66.3 |
| Lead leached (mg/l) | 0.6 | 0.3 | 0.5 | 0.8 | 1.0 | 1.3 |
| Coefficient of thermal expansion (×10$^{-7}$/° C.) | 98 | 100 | 95 | 97 | 95 | 98 |

Each sample in Tables 1 and 2 was prepared in the following manner.

At first, a glass batch was prepared to have a composition specified in the Tables. The batch was put in a platinum crucible and then melted at a temperature of about 1480–1500° C. for 4 hours to obtain a molten glass. In order to obtain a homogeneous glass, the molten glass was agitated for three minutes by the use of a platinum agitating rod in the middle of this melting process to perform degassing. Thereafter, the molten glass was poured into a mold and gradually cooled. Thus, each sample was prepared.

Each sample thus obtained was subjected to measurement of the coefficient of X-ray absorption, the amount of lead leached, and the coefficient of thermal expansion. Results of measurement are shown in the Tables.

As obvious from Table 1, each of the samples Nos. 1–5 as the examples of the present invention exhibited a high X-ray absorption coefficient not smaller than 89.8 cm$^{-1}$ and a small lead amount leached of 0.3–1.1 mg/l. On the other hand, the sample No. 6 as the comparative example exhibited a high X-ray absorption coefficient equal to 101.8 cm$^{-1}$, but the lead amount leached was as much as 1.4 mg/l.

As obvious from Table 2, each of the samples Nos. 7–11 as the examples of the present invention exhibited a high X-ray absorption coefficient not smaller than 60.0 cm$^{-1}$ and a small lead amount leached of 0.3–1.0 mg/l. On the other hand, the sample No. 12 as the comparative example exhibited a high X-ray absorption coefficient equal to 66.3 cm$^{-1}$, but the lead amount leached was as much as 1.3 mg/l.

Each of the samples Nos. 1–6 had a coefficient of thermal expansion of 92–98×10$^{-7}$/° C., which is equivalent to that of an existing neck glass for a color CRT. Each of the samples Nos. 7–12 had a coefficient of thermal expansion of 95–100×10$^{-7}$/° C., which is equivalent to that of an existing funnel glass for a color CRT.

Each of the above-mentioned coefficients of X-ray absorption was calculated with respect to an X-ray having a wavelength of 0.6 angstrom with reference to the glass composition and the density.

The amount of lead leached was obtained in the following manner.

At first, each of the glass samples was crushed and classified to select crushed particles which can pass through a sieve with a mesh size of 420 microns but cannot pass through a sieve with a mesh size of 250 microns. Next, the crushed and selected particles were washed with water, transferred into a beaker, and dried in a drier. Then, 10 g of the crushed particles were poured into an Erlenmeyer flask together with 100 ml of pure water, and subject to an autoclave treatment at a temperature of 121° C. for a period of 60 minutes. Thereafter, the amount of Pb contained in the resultant solution was measured by the ICP-AES method to determine the amount of lead leached.

The coefficient of thermal expansion was measured as an average coefficient of thermal expansion over a temperature range of 30–380° C. by the use of the dilatometer.

EFFECT OF THE INVENTION

As described so far, the CRT bulb glass according to the present invention contains $Fe_2O_3$ not smaller than 0.06 weight % as well as 10–40 weight % PbO, and can remarkably suppress the lead contained therein to leach. Consequently, the X-ray absorbing CRT bulb glass of the present invention is advantageous from the viewpoint of environmental protection and is suitable especially for a neck glass or a funnel glass of a color CRT.

What is claimed is:

1. A neck glass of an X-ray absorbing CRT bulb containing 20–40 weight % PbO and 0.06–1.5 weight % $Fe_2O_3$ to suppress lead from leaching and having an absorption coefficient not smaller than 80 cm$^{-1}$ with respect to an X-ray having a wavelength of 0.6 angstrom.

2. A neck glass of an X-ray absorbing CRT bulb as claimed in claim 1, wherein said glass essentially consists of, by weight percent, 38–58% $SiO_2$, 0–5% $Al_2O_3$, 20–40% PbO, 0–5% MgO, 0–6% CaO, 0–9% SrO, 0–9% BaO, 0–5% $Na_2O$, 6–15% $K_2O$, 0–1% $Sb_2O_3$, 0–10% $TiO_2$, and 0.06–1.5% $Fe_2O_3$.

3. A funnel glass of an X-ray absorbing CRT bulb containing 10–30 weight % PbO, 1–6 weight % CaO and 0.06–1.5 weight % $Fe_2O_3$ to suppress lead from leaching and having an absorption coefficient not smaller than 40 cm$^{-1}$ with respect to an X-ray having a wavelength of 0.6 angstrom.

4. A funnel glass of an X-ray absorbing CRT claimed in claim 3, wherein said glass essentially consists of, by weight percent, 48–58% $SiO_2$, 0.5–6% $Al_2O_3$, 10–30% PbO, 0–5% MgO, 1–6% CaO, 0–9% SrO, 0–9% BaO, 3–9% $Na_2O$, 4–11% $K_2O$, 0–1% $Sb_2O_3$, 0–10% $TiO_2$, and 0.06–1.5 weight % $Fe_2O_3$.

* * * * *